United States Patent
Nishimura

(10) Patent No.: US 12,466,943 B2
(45) Date of Patent: Nov. 11, 2025

(54) VINYL CHLORIDE RESIN COMPOSITION, VINYL CHLORIDE RESIN MOLDED PRODUCT, AND LAMINATE

(71) Applicant: ZEON CORPORATION, Tokyo (JP)

(72) Inventor: Shota Nishimura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 450 days.

(21) Appl. No.: 17/904,483

(22) PCT Filed: Feb. 15, 2021

(86) PCT No.: PCT/JP2021/005569
§ 371 (c)(1),
(2) Date: Aug. 18, 2022

(87) PCT Pub. No.: WO2021/172076
PCT Pub. Date: Sep. 2, 2021

(65) Prior Publication Data
US 2023/0095316 A1    Mar. 30, 2023

(30) Foreign Application Priority Data
Feb. 27, 2020  (JP) ................. 2020-032299

(51) Int. Cl.
C08L 27/06   (2006.01)
C08F 14/06   (2006.01)
C08L 67/00   (2006.01)

(52) U.S. Cl.
CPC ............. *C08L 27/06* (2013.01); *C08F 14/06* (2013.01); *C08L 67/00* (2013.01)

(58) Field of Classification Search
None
See application file for complete search history.

(56) References Cited

U.S. PATENT DOCUMENTS

| | | | |
|---|---|---|---|
| 4,956,222 A | 9/1990 | Matsuura et al. | |
| 5,321,090 A | * 6/1994 | Nakatsuji | C08L 27/06 524/522 |
| 2006/0025544 A1 | * 2/2006 | Koube | C08G 63/16 525/437 |

FOREIGN PATENT DOCUMENTS

| | | |
|---|---|---|
| CN | 105670176 A | 6/2016 |
| EP | 2889137 A1 | 7/2015 |
| JP | S59142241 A | 8/1984 |
| JP | H02646 A | 1/1990 |
| JP | H105125245 A | 5/1993 |
| JP | H05287149 A | 11/1993 |
| JP | H0859938 A | 3/1996 |
| JP | H08291243 A | 11/1996 |
| JP | 2016183289 A | 10/2016 |

OTHER PUBLICATIONS

Annika Lindstrom, "Environmentally Friendly Plasticizers for PVC" (Royal Institute of Technology, 2007). Dissertation for Doctor of Engineering. (Year: 2007).*
Aug. 30, 2022, International Preliminary Report on Patentability issued in the International Patent Application No. PCT/JP2021/005569.
Feb. 27, 2024, the Extended European Search Report issued by the European Patent Office in the corresponding European Patent Application No. 21759726.9.
Apr. 27, 2021, International Search Report issued in the International Patent Application No. PCT/JP2021/005569.
Apr. 4, 2025, Communication pursuant to Article 94(3) EPC issued by the European Patent Office in the corresponding European Patent Application No. 21759726.9.

* cited by examiner

*Primary Examiner* — Richard A. Huhn
(74) *Attorney, Agent, or Firm* — KENJA IP LAW PC

(57) ABSTRACT

Provided is a vinyl chloride resin composition that can form a vinyl chloride resin molded product having excellent adhesiveness to a foamed polyurethane molded product. The vinyl chloride resin composition contains a vinyl chloride resin, a plasticizer, and a vinyl chloride-(meth)acrylate copolymer.

10 Claims, No Drawings

VINYL CHLORIDE RESIN COMPOSITION, VINYL CHLORIDE RESIN MOLDED PRODUCT, AND LAMINATE

TECHNICAL FIELD

The present disclosure relates to a vinyl chloride resin composition, a vinyl chloride resin molded product, and a laminate.

BACKGROUND

Vinyl chloride resins are used in a variety of applications due to generally having excellent characteristics in terms of cold resistance, heat resistance, oil resistance, and so forth.

Specifically, automobile interior materials such as a surface skin formed of a vinyl chloride resin molded product and a laminate obtained by lining a surface skin formed of a vinyl chloride resin molded product with a foamed product such as foamed polyurethane are used in the formation of automobile interior components such as automobile instrument panels and door trims.

A vinyl chloride resin molded product that constitutes a surface skin of an automobile interior component such as an automobile instrument panel is produced, for example, by performing powder molding by a known molding method such as powder slush molding with respect to a vinyl chloride resin composition that contains a vinyl chloride resin, a plasticizer, and additives such as a pigment (for example, refer to Patent Literature (PTL) 1).

In one specific example described in PTL 1, a surface skin formed of a vinyl chloride resin molded product is produced through powder slush molding of a vinyl chloride resin composition that contains vinyl chloride resin particles, a trimellitic acid ester plasticizer, and additives such as a pigment formed of a mixture of phthalocyanine blue, titanium oxide, and carbon.

CITATION LIST

Patent Literature

PTL 1: JP-H8-291243A

SUMMARY

Technical Problem

When a vinyl chloride resin molded product used as a surface skin of an automobile interior component or the like is lined with a foamed polyurethane molded product so as to form a laminate, it is desirable for the vinyl chloride resin molded product and the foamed polyurethane molded product to be adhered well and to not be easily peeled apart.

However, there is room for improvement of a vinyl chloride resin molded product obtained through molding of the conventional vinyl chloride resin composition described above in terms of adhesiveness to a foamed polyurethane molded product.

Accordingly, one object of the present disclosure is to provide a vinyl chloride resin composition that can form a vinyl chloride resin molded product having excellent adhesiveness to a foamed polyurethane molded product.

Another object of the present disclosure is to provide a vinyl chloride resin molded product having excellent adhesiveness to a foamed polyurethane molded product.

Yet another object of the present disclosure is to provide a laminate in which a vinyl chloride resin molded product and a foamed polyurethane molded product are adhered well.

Solution to Problem

The inventor conducted diligent investigation with the aim of solving the problem set forth above. The inventor discovered that by molding a vinyl chloride resin composition containing a vinyl chloride resin, a plasticizer, and a specific copolymer, a vinyl chloride resin molded product having excellent adhesiveness to a foamed polyurethane molded product is obtained, and, in this manner, completed the present disclosure.

Specifically, the present disclosure aims to advantageously solve the problem set forth above, and a presently disclosed vinyl chloride resin composition comprises a vinyl chloride resin, a plasticizer, and a vinyl chloride-(meth) acrylate copolymer. By using a vinyl chloride resin composition that contains a vinyl chloride resin, a plasticizer, and a specific copolymer in this manner, it is possible to form a vinyl chloride resin molded product having excellent adhesiveness to a foamed polyurethane molded product.

Note that in the present disclosure, "(meth)acrylate" is used to indicate "acrylate" and/or "methacrylate". Accordingly, the term "vinyl chloride-(meth)acrylate copolymer" as used in the present disclosure refers to a vinyl chloride-acrylate copolymer and/or a vinyl chloride-methacrylate copolymer.

In the presently disclosed vinyl chloride resin composition, content of the vinyl chloride-(meth)acrylate copolymer is preferably not less than 0.5 parts by mass and not more than 10 parts by mass relative to 100 parts by mass of the vinyl chloride resin. When the content of the vinyl chloride-(meth)acrylate copolymer is within the specific range set forth above, adhesiveness of a formed vinyl chloride resin molded product to a foamed polyurethane molded product can be further increased, and tensile characteristics (for example, tensile elongation and tensile strength) of the vinyl chloride resin molded product can be improved.

In the presently disclosed vinyl chloride resin composition, a proportion constituted by (meth)acrylate-derived structural units in the vinyl chloride-(meth)acrylate copolymer is preferably not less than 3 mass % and not more than 50 mass %. When the proportion constituted by (meth) acrylate-derived structural units in the vinyl chloride-(meth) acrylate copolymer is within the specific range set forth above, adhesiveness of a formed vinyl chloride resin molded product to a foamed polyurethane molded product can be further increased, and tensile characteristics (for example, tensile elongation and tensile strength) of the vinyl chloride resin molded product can be improved.

In the presently disclosed vinyl chloride resin composition, the plasticizer preferably includes a polyester. When the plasticizer includes a polyester, tensile characteristics (for example, tensile elongation and tensile strength) of a formed vinyl chloride resin molded product can be improved, and heat shrinkage resistance of a laminate obtained by lining the vinyl chloride resin molded product with a foamed polyurethane molded product can be improved.

In the presently disclosed vinyl chloride resin composition, the polyester preferably includes an adipic acid-derived structural unit and a 3-methyl-1,5-pentanediol-derived structural unit. When the polyester includes an adipic acid-derived structural unit and a 3-methyl-1,5-pentanediol-derived structural unit, tensile characteristics (for example, tensile elongation and tensile strength) of a formed vinyl chloride resin molded product can be further improved, and heat shrinkage resistance of a laminate obtained by lining the vinyl chloride resin molded product with a foamed polyurethane molded product can be further improved.

The presently disclosed vinyl chloride resin composition is preferably used in powder molding. By using the vinyl chloride resin composition in powder molding, it is easy to obtain a vinyl chloride resin molded product that can be used well as an automobile interior material such as a surface skin for an automobile instrument panel, for example.

Moreover, the presently disclosed vinyl chloride resin composition is preferably used in powder slush molding. By using the vinyl chloride resin composition in powder slush molding, it is even easier to obtain a vinyl chloride resin molded product that can be used well as an automobile interior material such as a surface skin for an automobile instrument panel, for example.

Moreover, the present disclosure aims to advantageously solve the problem set forth above, and a presently disclosed vinyl chloride resin molded product is obtained through molding of any one of the vinyl chloride resin compositions set forth above. A vinyl chloride resin molded product that is obtained through molding of the vinyl chloride resin composition set forth above in this manner can display excellent adhesiveness to a foamed polyurethane molded product.

The presently disclosed vinyl chloride resin molded product is preferably for an automobile instrument panel surface skin. The presently disclosed vinyl chloride resin molded product can suitably be used as a surface skin of an automobile instrument panel having excellent adhesiveness to a foamed polyurethane molded product.

It is preferable that the presently disclosed vinyl chloride resin molded product is a sheet-shaped vinyl chloride resin molded product and that particles of the vinyl chloride-(meth)acrylate copolymer are present at one surface of the sheet-shaped vinyl chloride resin molded product. When particles of the vinyl chloride-(meth)acrylate copolymer are present at one surface of a sheet-shaped vinyl chloride resin molded product, adhesiveness of the vinyl chloride resin molded product to a foamed polyurethane molded product can be further increased.

Furthermore, the present disclosure aims to advantageously solve the problem set forth above, and a presently disclosed laminate comprises: a foamed polyurethane molded product; and any one of the vinyl chloride resin molded products set forth above. A laminate that includes a foamed polyurethane molded product and the vinyl chloride resin molded product set forth above has good adhesion between the vinyl chloride resin molded product and the foamed polyurethane molded product.

The presently disclosed laminate is preferably for an automobile instrument panel. When the presently disclosed laminate is used as an automobile instrument panel in this manner, a surface skin part of the produced automobile instrument panel and a foamed polyurethane molded product part of the automobile instrument panel can adhere well to each other.

Advantageous Effect

According to the present disclosure, it is possible to provide a vinyl chloride resin composition that can form a vinyl chloride resin molded product having excellent adhesiveness to a foamed polyurethane molded product.

Moreover, according to the present disclosure, it is possible to provide a vinyl chloride resin molded product having excellent adhesiveness to a foamed polyurethane molded product.

Furthermore, according to the present disclosure, it is possible to provide a laminate in which a vinyl chloride resin molded product and a foamed polyurethane molded product are adhered well.

DETAILED DESCRIPTION

The following provides a detailed description of embodiments of the present disclosure.

The presently disclosed vinyl chloride resin composition can be used, for example, in formation of the presently disclosed vinyl chloride resin molded product. Moreover, a vinyl chloride resin molded product formed using the presently disclosed vinyl chloride resin composition can suitably be used, for example, as an automobile interior material such as a surface skin included in an automobile interior component such as an automobile instrument panel or a door trim.

The presently disclosed vinyl chloride resin molded product can be used, for example, in formation of the presently disclosed laminate. Moreover, a laminate formed using the presently disclosed vinyl chloride resin molded product can suitably be used, for example, as an automobile interior material used in production of an automobile interior component such as an automobile instrument panel or a door trim.

(Vinyl Chloride Resin Composition)

A feature of the presently disclosed vinyl chloride resin composition is that it contains: (a) a vinyl chloride resin; (b) a plasticizer; and (c) a vinyl chloride-(meth)acrylate copolymer.

Note that the presently disclosed vinyl chloride resin composition may optionally further contain additives other than the (a) vinyl chloride resin, (b) plasticizer, and (c) vinyl chloride-(meth)acrylate copolymer.

The presently disclosed vinyl chloride resin composition can form a vinyl chloride resin molded product having excellent adhesiveness to a foamed polyurethane molded product as a result of containing at least the (a) vinyl chloride resin, (b) plasticizer, and (c) vinyl chloride-(meth) acrylate copolymer. Accordingly, the presently disclosed vinyl chloride resin composition can be used, for example, to obtain a vinyl chloride resin molded product that is suitable as an automobile interior material, such as a surface skin for an automobile instrument panel or a surface skin for a door trim, that has excellent adhesiveness to a foamed polyurethane molded product.

Note that from a viewpoint of easily obtaining a vinyl chloride resin molded product that can be used well as an automobile interior material using the presently disclosed vinyl chloride resin composition, for example, the presently disclosed vinyl chloride resin composition is preferably used in powder molding, and is more preferably used in powder slush molding.

<(a) Vinyl Chloride Resin>

A particulate vinyl chloride resin is normally used as the (a) vinyl chloride resin. For example, one type or two or more types of vinyl chloride resin particles can be included as the (a) vinyl chloride resin, and one type or two or more types of vinyl chloride resin fine particles can optionally be further included as the (a) vinyl chloride resin. In particular, the (a) vinyl chloride resin preferably includes at least vinyl chloride resin particles, and more preferably includes vinyl chloride resin particles and vinyl chloride resin fine particles.

Conventionally known production methods such as suspension polymerization, emulsion polymerization, solution polymerization, and bulk polymerization can be used to produce the (a) vinyl chloride resin.

In the present specification, the term "resin particles" is used to refer to particles having a particle diameter of 30 μm or more, whereas the term "resin fine particles" is used to refer to particles having a particle diameter of less than 30 μm.

Examples of the (a) vinyl chloride resin include homopolymers composed of vinyl chloride monomer units and vinyl chloride copolymers preferably comprising 50 mass % or more of vinyl chloride monomer units, and more preferably comprising 70 mass % or more of vinyl chloride monomer units. Specific examples of monomers (comonomers) that are copolymerizable with vinyl chloride monomer and can be used to form a vinyl chloride copolymer include monomers among those described in WO2016/098344A1, for example, that do not correspond to (meth)acrylate monomers that can serve as a comonomer of the subsequently described (c) vinyl chloride-(meth)acrylate copolymer. One of these components may be used individually, or two or more of these components may be used in combination in a freely selected ratio.

<<Vinyl Chloride Resin Particles>>

In the vinyl chloride resin composition, the vinyl chloride resin particles normally function as a matrix resin (base material). The vinyl chloride resin particles are preferably produced by suspension polymerization.

[Average Degree of Polymerization]

The average degree of polymerization of a vinyl chloride resin forming the vinyl chloride resin particles is preferably 800 or more, and more preferably 1,000 or more, and is preferably 5,000 or less, more preferably 3,000 or less, and even more preferably 2,800 or less. This is because sufficient physical strength of a vinyl chloride resin molded product formed using the vinyl chloride resin composition can be ensured while also improving tensile characteristics (particularly tensile elongation), for example, when the average degree of polymerization of the vinyl chloride resin forming the vinyl chloride resin particles is not less than any of the lower limits set forth above. A vinyl chloride resin molded product having good tensile elongation can suitably be used as an automobile interior material, such as a surface skin of an automobile instrument panel, that has excellent ductility and that ruptures as designed without scattering of fragments when an airbag expands and is deployed, for example. Moreover, when the average degree of polymerization of the vinyl chloride resin forming the vinyl chloride resin particles is not more than any of the upper limits set forth above, meltability of the vinyl chloride resin composition can be improved.

The "average degree of polymerization" referred to in the present disclosure can be measured in accordance with JIS K6720-2.

[Average Particle Diameter]

The average particle diameter of the vinyl chloride resin particles is normally 30 μm or more, preferably 50 μm or more, and more preferably 100 μm or more, and is preferably 500 μm or less, and more preferably 200 μm or less. This is because powder fluidity of the vinyl chloride resin composition further improves when the average particle diameter of the vinyl chloride resin particles is not less than any of the lower limits set forth above. Moreover, meltability of the vinyl chloride resin composition improves and surface smoothness of a vinyl chloride resin molded product formed using the composition can be improved when the average particle diameter of the vinyl chloride resin particles is not more than any of the upper limits set forth above.

The "average particle diameter" referred to in the present disclosure can be measured as the volume-average particle diameter by laser diffraction in accordance with JIS Z8825.

[Proportional Content]

The proportional content of the vinyl chloride resin particles in the (a) vinyl chloride resin is preferably 70 mass % or more, and more preferably 80 mass % or more, may be 100 mass %, and is preferably 95 mass % or less, and more preferably 90 mass % or less. This is because sufficient physical strength of a vinyl chloride resin molded product formed using the vinyl chloride resin composition can be ensured while also improving tensile elongation when the proportional content of the vinyl chloride resin particles in the (a) vinyl chloride resin is not less than any of the lower limits set forth above. Moreover, powder fluidity of the vinyl chloride resin composition improves when the proportional content of the vinyl chloride resin particles in the (a) vinyl chloride resin is not more than any of the upper limits set forth above.

<<Vinyl Chloride Resin Fine Particles>>

In the vinyl chloride resin composition, the vinyl chloride resin fine particles normally function as a dusting agent (powder fluidity modifier). The vinyl chloride resin fine particles are preferably produced by emulsion polymerization.

[Average Degree of Polymerization]

The average degree of polymerization of a vinyl chloride resin forming the vinyl chloride resin fine particles is preferably 500 or more, and more preferably 700 or more, and is preferably 2,600 or less, and more preferably 2,400 or less. This is because powder fluidity of the vinyl chloride resin composition improves, and tensile elongation of a molded product obtained using the composition improves when the average degree of polymerization of the vinyl chloride resin forming the vinyl chloride resin fine particles serving as a dusting agent is not less than any of the lower limits set forth above. Moreover, meltability of the vinyl chloride resin composition improves, and surface smoothness of a vinyl chloride resin molded product formed using the composition improves when the average degree of polymerization of the vinyl chloride resin forming the vinyl chloride resin fine particles is not more than any of the upper limits set forth above.

[Average Particle Diameter]

The average particle diameter of the vinyl chloride resin fine particles is normally less than 30 μm, preferably 10 μm or less, and more preferably 5 μm or less, and is preferably 0.1 μm or more, and more preferably 1 μm or more. This is because the vinyl chloride resin fine particles are not too small to function as a dusting agent, for example, and powder fluidity of the vinyl chloride resin composition can be further improved when the average particle diameter of the vinyl chloride resin fine particles is not less than any of the lower limits set forth above. Moreover, when the average particle diameter of the vinyl chloride resin fine particles is not more than any of the upper limits set forth above, meltability of the vinyl chloride resin composition increases, and surface smoothness of a formed vinyl chloride resin molded product can be further improved.

[Proportional Content]

The proportional content of the vinyl chloride resin fine particles in the (a) vinyl chloride resin may be 0 mass %, but is preferably 5 mass % or more, and more preferably 10 mass % or more, and is preferably 30 mass % or less, and more preferably 20 mass % or less. This is because powder fluidity of the vinyl chloride resin composition further improves when the proportional content of the vinyl chloride resin fine particles in the (a) vinyl chloride resin is not less than any of the lower limits set forth above. Moreover, physical strength of a vinyl chloride resin molded product formed using the vinyl chloride resin composition can be further increased when the proportional content of the vinyl chloride resin fine particles in the (a) vinyl chloride resin is not more than any of the upper limits set forth above.

<(b) Plasticizer>

The (b) plasticizer is not specifically limited but preferably includes (b1) a polyester. When the (b1) polyester is included as the (b) plasticizer used in the presently disclosed vinyl chloride resin composition, tensile characteristics (for example, tensile elongation and tensile strength) of a formed vinyl chloride resin molded product can be improved, and heat shrinkage resistance of a laminate obtained by lining the vinyl chloride resin molded product with a foamed polyurethane molded product can be improved.

Note that the (b) plasticizer may include other plasticizers besides the (b1) polyester.

<<(b1) Polyester>>

The (b1) polyester included in the (b) plasticizer is not specifically limited and can, for example, be a polyester such as a polyester including a structural unit derived from adipic acid (adipic acid-based polyester), a polyester including a structural unit derived from sebacic acid (sebacic acid-based polyester), or a polyester including a structural unit derived from phthalic acid (phthalic acid-based polyester). One of these polyesters may be used individually, or two or more of these polyesters may be used as a mixture in a freely selected ratio.

In particular, from a viewpoint of further improving tensile characteristics (for example, tensile elongation and tensile strength) of a vinyl chloride resin molded product and further improving heat shrinkage resistance of a laminate obtained by lining the vinyl chloride resin molded product with a foamed polyurethane molded product, it is preferable to use a polyester that includes a structural unit derived from adipic acid as the (b1) polyester, and particularly preferable to use a polyester that includes a structural unit derived from adipic acid and a structural unit derived from 3-methyl-1,5-pentanediol as the (b1) polyester.

In order to facilitate description, a polyester including an adipic acid-derived structural unit and a 3-methyl-1,5-pentanediol-derived structural unit is referred to below as a "polyester A".

Although the polyester A including the specific structural units described above may include structural units other than an adipic acid-derived structural unit and a 3-methyl-1,5-pentanediol-derived structural unit, the total of adipic acid-derived structural units and 3-methyl-1,5-pentanediol-derived structural units is preferably 50 mass % or more of all structural units, and more preferably 80 mass % or more of all structural units. Moreover, the polyester A including the specific structural units described above preferably only includes an adipic acid-derived structural unit and a 3-methyl-1,5-pentanediol-derived structural unit as repeating units.

The polyester A including the specific structural units described above can be obtained through condensation polymerization of adipic acid and 3-methyl-1,5-pentanediol without any specific limitations. This condensation polymerization can be performed in the presence of a catalyst. Moreover, the condensation polymerization can be performed using an alcohol and/or a monobasic acid as a terminal stopping component. The condensation polymerization of adipic acid and 3-methyl-1,5-pentanediol and the termination reaction of the obtained polycondensate and the terminal stopping component may be performed in one go or may be performed separately. A product that is obtained through the condensation polymerization and the termination reaction may be subjected to after-treatment such as distillation. Commonly known conditions can be adopted as the reaction conditions of the condensation polymerization, such as the used amounts of the monomers, the catalyst, and the terminal stopping component described above.

Also note that a commercially available product may be used as the polyester A including the specific structural units described above.

The catalyst used in the condensation polymerization reaction is not specifically limited and may be dibutyltin oxide, tetraalkyl titanate, or the like, for example.

Examples of alcohols that can be used as the terminal stopping component include methanol, ethanol, propanol, isopropanol, butanol, isobutanol, pentanol, hexanol, isohexanol, heptanol, isoheptanol, octanol, isooctanol, 2-ethylhexanol, nonanol, isononanol, decanol, isodecanol, undecanol, isoundecanol, dodecanol, tridecanol, isotridecanol, tetradecanol, pentadecanol, hexadecanol, heptadecanol, octadecanol, cellosolve, carbitol, phenol, nonylphenol, benzyl alcohol, and mixtures thereof.

Examples of monobasic acids that can be used as the terminal stopping component include acetic acid, propionic acid, butyric acid, isobutyric acid, valeric acid, pivalic acid, caproic acid, heptanoic acid, caprylic acid, 2-ethylhexanoic acid, pelargonic acid, capric acid, undecanoic acid, lauric acid, tridecanoic acid, myristic acid, pentadecanoic acid, palmitic acid, heptadecanoic acid, stearic acid, benzoic acid, and mixtures thereof.

Of these examples, 2-ethylhexanol is preferable as the terminal stopping component.

The number-average molecular weight of the polyester A including the specific structural units described above is preferably 1,000 or more, and more preferably 2,000 or more, and is preferably 10,000 or less, and more preferably 7,000 or less.

Note that the "number-average molecular weight" can be measured by VPO (vapor pressure osmometry).

Moreover, the polyester A including the specific structural units described above preferably has an acid value of 1 mg KOH/g or less.

Furthermore, the polyester A including the specific structural units described above preferably has a hydroxyl value of 30 mg KOH/g or less.

The viscosity of the polyester A including the specific structural units described above is preferably 500 m·Pas or more, and more preferably 1,000 m·Pas or more, and is preferably 8,000 m·Pas or less, and more preferably 5,000 m·Pas or less.

Note that the "viscosity" can be measured in accordance with JIS Z8803 at a temperature of 23° C.

[Proportional Content]

The proportional content of the (b1) polyester among the (b) plasticizer is preferably 80 mass % or more, more preferably 90 mass % or more, and even more preferably 95 mass % or more, can be 100 mass % or less, and is preferably 99 mass % or less, and more preferably 98 mass % or less. When the proportional content of the (b1) polyester among the (b) plasticizer is not less than any of the lower limits set forth above, tensile characteristics (for example, tensile elongation and tensile strength) of a formed vinyl chloride resin molded product can be further improved, and heat shrinkage resistance of a laminate obtained by lining a vinyl chloride resin molded product with a foamed polyurethane molded product can be further improved. On the other hand, when the proportional content of the (b1) polyester among the (b) plasticizer is not more than any of the upper limits set forth above, sufficiently high adhesiveness of a vinyl chloride resin molded product to a foamed polyurethane molded product can be ensured, and tensile characteristics (for example, tensile elongation and tensile strength) of the vinyl chloride resin molded product can be maintained well.

[Content]

The content of the (b1) polyester in the vinyl chloride resin composition is preferably 80 parts by mass or more, more preferably 90 parts by mass or more, and even more preferably 100 parts by mass or more relative to 100 parts by mass of the (a) vinyl chloride resin, and is preferably 200 parts by mass or less, more preferably 180 parts by mass or less, and even more preferably 150 parts by mass or less relative to 100 parts by mass of the (a) vinyl chloride resin. When the content of the (b1) polyester in the vinyl chloride resin composition is not less than any of the lower limits set forth above, tensile characteristics (for example, tensile elongation and tensile strength) of a formed vinyl chloride resin molded product can be further improved, and heat shrinkage resistance of a laminate obtained by lining the vinyl chloride resin molded product with a foamed polyurethane molded product can be further improved. On the other hand, when the content of the (b1) polyester in the vinyl chloride resin composition is not more than any of the upper limits set forth above, sufficiently high adhesiveness of a vinyl chloride resin molded product to a foamed polyurethane molded product can be ensured, and tensile characteristics (for example, tensile elongation and tensile strength) of the vinyl chloride resin molded product can be maintained well.

<<(b2) Other Plasticizers>>

The (b) plasticizer contained in the vinyl chloride resin composition may optionally include plasticizers other than the (b1) polyester described above (also referred to as "(b2) other plasticizers").

Specific examples of the (b2) other plasticizers include plasticizers among those described in WO2016/098344A1 that do not correspond to the (b1) polyester described above. Of these plasticizers, epoxidized soybean oil is preferable from a viewpoint of improving tensile characteristics (for example, tensile elongation and tensile strength) of a formed vinyl chloride resin molded product.

The proportional content of the (b2) other plasticizers among the (b) plasticizer is not specifically limited but is preferably not less than 0 mass % and not more than 5 mass %. When the proportional content of the (b2) other plasticizers among the (b) plasticizer is within the range set forth above, tensile characteristics (for example, tensile elongation and tensile strength) of a formed vinyl chloride resin molded product can be improved.

The content of the (b2) other plasticizers in the vinyl chloride resin composition is not specifically limited and can be set as not less than 0 parts by mass and not more than 5 parts by mass relative to 100 parts by mass of the (a) vinyl chloride resin.

The total content of the (b1) polyester and (b2) other plasticizers (i.e., the content of the (b) plasticizer) in the vinyl chloride resin composition is preferably 80 parts by mass or more, more preferably 90 parts by mass or more, and even more preferably 100 parts by mass or more relative to 100 parts by mass of the vinyl chloride resin, and is preferably 205 parts by mass or less, more preferably 185 parts by mass or less, and even more preferably 155 parts by mass or less relative to 100 parts by mass of the vinyl chloride resin. When the total content of the (b1) polyester and (b2) other plasticizers (i.e., the content of the (b) plasticizer) in the vinyl chloride resin composition is within any of the specific ranges set forth above, tensile characteristics (for example, tensile elongation and tensile strength) of a formed vinyl chloride resin molded product can be improved.

<(c) Vinyl Chloride-(Meth)Acrylate Copolymer>

The (c) vinyl chloride-(meth)acrylate copolymer contained in the presently disclosed vinyl chloride resin composition is a copolymer obtained through copolymerization of vinyl chloride monomer and a (meth)acrylate monomer. In other words, the (c) vinyl chloride-(meth)acrylate copolymer includes a structural unit derived from vinyl chloride and a structural unit derived from a (meth)acrylate.

As a result of the presently disclosed vinyl chloride resin composition containing the (c) vinyl chloride-(meth)acrylate copolymer, a formed vinyl chloride resin molded product can display excellent adhesiveness to a foamed polyurethane molded product.

Note that the "copolymerization" referred to above may be a random copolymerization, block copolymerization, or graft copolymerization. In other words, the (c) vinyl chloride-(meth)acrylate copolymer may be a random copolymer, block copolymer, or graft copolymer of vinyl chloride monomer and a (meth)acrylate monomer. From a viewpoint of further increasing adhesiveness of a formed vinyl chloride resin molded product to a foamed polyurethane molded product, the (c) vinyl chloride-(meth)acrylate copolymer is preferably a graft copolymer of vinyl chloride monomer and a (meth)acrylate monomer.

Note that the (c) vinyl chloride-(meth)acrylate copolymer is a component differing from the previously described (a) vinyl chloride resin.

Examples of (meth)acrylate monomers that can be copolymerized with vinyl chloride monomer include, but are not specifically limited to, acrylate compounds such as methyl acrylate, ethyl acrylate, n-propyl acrylate, isopropyl acrylate, n-butyl acrylate, t-butyl acrylate, isobutyl acrylate, n-hexyl acrylate, 2-ethylhexyl acrylate, lauryl acrylate, n-tetradecyl acrylate, n-hexadecyl acrylate, cyclohexyl acrylate, 2-acryloyloxyethyl succinate, 2-hydroxyethyl acrylate, 2-hydroxypropyl acrylate, trimethylolpropane triacrylate, ethylene oxide-modified trimethylolpropane triacrylate, pentaerythritol tetraacrylate, and dipentaerythritol hexaacrylate; and methacrylate compounds such as methyl methacrylate, ethyl methacrylate, n-hexyl methacrylate, n-tetradecyl methacrylate, n-butyl methacrylate, n-octyl methacrylate, n-decyl methacrylate, n-dodecyl methacrylate, 2-hydroxyethyl methacrylate, trimethylolpropane trimethacrylate, ethylene oxide-modified trimethylolpropane trimethacrylate, pentaerythritol tetramethacrylate, and dipentaerythritol hexamethacrylate. Just one of these (meth)acrylate monomers may be used individually, or a plurality of these (meth)acrylate monomers may be used as a mixture in a freely selected ratio.

The method by which the vinyl chloride monomer and (meth)acrylate monomer are copolymerized may be a known polymerization method such as emulsion polymerization or suspension polymerization, for example.

In copolymerization of the vinyl chloride monomer and (meth)acrylate monomer to form the (c) vinyl chloride- (meth)acrylate copolymer, a comonomer other than the vinyl chloride monomer and (meth)acrylate monomer may be used. In other words, the (c) vinyl chloride-(meth)acrylate copolymer may include a structural unit other than the vinyl chloride-derived structural unit and (meth)acrylate-derived structural unit described above.

The proportion constituted by (meth)acrylate-derived structural units in the (c) vinyl chloride-(meth)acrylate copolymer is preferably 3 mass % or more, more preferably 5 mass % or more, even more preferably 7 mass % or more, and further preferably 15 mass % or more, and is preferably 80 mass % or less, more preferably 60 mass % or less, even more preferably 50 mass % or less, and further preferably 35 mass % or less. When the proportion constituted by (meth)acrylate-derived structural units in the (c) vinyl chloride-(meth)acrylate copolymer is not less than any of the lower limits set forth above, adhesiveness of a formed vinyl chloride resin molded product to a foamed polyurethane molded product can be further increased, and tensile characteristics (for example, tensile elongation and tensile strength) of the vinyl chloride resin molded product can be improved. On the other hand, when the proportion constituted by (meth)acrylate-derived structural units in the (c) vinyl chloride-(meth)acrylate copolymer is not more than any of the upper limits set forth above, tensile characteristics (for example, tensile elongation and tensile strength) of a formed vinyl chloride resin molded product can be improved.

The degree of polymerization of the (c) vinyl chloride-(meth)acrylate copolymer is preferably 600 or more, more preferably 650 or more, and even more preferably 700 or more, and is preferably 1,500 or less, more preferably 1,200 or less, and even more preferably 1,000 or less. When the degree of polymerization of the (c) vinyl chloride-(meth)acrylate copolymer is within any of the specific ranges set forth above, adhesiveness of a formed vinyl chloride resin molded product to a foamed polyurethane molded product can be further increased, and tensile characteristics (for example, tensile elongation and tensile strength) of the vinyl chloride resin molded product can be improved.

The (c) vinyl chloride-(meth)acrylate copolymer is normally present as particles in the vinyl chloride resin composition.

The average particle diameter of particles of the (c) vinyl chloride-(meth)acrylate copolymer is preferably 10 μm or more, more preferably 30 μm or more, and even more preferably 50 μm or more, and is preferably 200 μm or less, more preferably 180 μm or less, and even more preferably 160 μm or less. When the average particle diameter of particles of the (c) vinyl chloride-(meth)acrylate copolymer is within any of the specific ranges set forth above, adhesiveness of a formed vinyl chloride resin molded product to a foamed polyurethane molded product can be further increased.

The melting point of the (c) vinyl chloride-(meth)acrylate copolymer is preferably 250° C. or lower, more preferably 240° C. or lower, and even more preferably 230° C. or lower, and is preferably 180° C. or higher, more preferably 190° C. or higher, and even more preferably 200° C. or higher. When the melting point of the (c) vinyl chloride-(meth)acrylate copolymer is not higher than any of the upper limits set forth above, external appearance of a formed vinyl chloride resin molded product can be maintained well because particles of the (c) vinyl chloride-(meth)acrylate copolymer melt well at a surface at a side in contact with a mold during molding of the vinyl chloride resin composition into the form of a sheet, for example. On the other hand, when the melting point of the (c) vinyl chloride-(meth)acrylate copolymer is not lower than any of the lower limits set forth above, adhesiveness of a formed vinyl chloride resin molded product to a foamed polyurethane molded product can be further increased because particles of the (c) vinyl chloride-(meth)acrylate copolymer remain to a suitable degree and can function as adhesion points at a surface at an opposite side to a side in contact with a mold during molding of the vinyl chloride resin composition into the form of a sheet, for example.

Note that the melting point of the (c) vinyl chloride-(meth)acrylate copolymer referred to in the present disclosure can be confirmed through the presence or absence of particles of the (c) vinyl chloride-(meth)acrylate copolymer at the surface of a vinyl chloride resin molded product obtained through molding of the vinyl chloride resin composition.

For example, when the maximum temperature of a mold used in molding of the vinyl chloride resin composition is taken to be T° C., the melting point of the (c) vinyl chloride-(meth)acrylate copolymer can be confirmed to be not lower than T−30° C. and not higher than T° C. in a case in which particles of the (c) vinyl chloride-(meth)acrylate copolymer are not present at a surface of an obtained sheet-shaped vinyl chloride resin molded product that was at a side in contact with the mold and in which particles of the (c) vinyl chloride-(meth)acrylate copolymer are present at a surface of the sheet-shaped vinyl chloride resin molded product that was at an opposite side to the side in contact with the mold. For example, when the maximum temperature of a mold used in molding of the vinyl chloride resin composition is set as 250° C., the melting point of the (c) vinyl chloride-(meth)acrylate copolymer can be confirmed to be within a range of not lower than 220° C. and not higher than 250° C. in a case in which particles of the (c) vinyl chloride-(meth)acrylate copolymer are not present at a surface of an obtained sheet-shaped vinyl chloride resin molded product that was at a side in contact with the mold and in which particles of the (c) vinyl chloride-(meth)acrylate copolymer are present at a surface of the sheet-shaped vinyl chloride resin molded product that was at an opposite side to the side in contact with the mold.

Note that a commercially available product can be used as the (c) vinyl chloride-(meth)acrylate copolymer. Examples of commercially available products that can be used include AG-40M, AG-162E, AG-72P, and AG-64T (each produced by Sekisui Chemical Co., Ltd.).

The content of the (c) vinyl chloride-(meth)acrylate copolymer in the vinyl chloride resin composition is preferably 0.5 parts by mass or more, more preferably 0.8 parts by mass or more, even more preferably 1.2 parts by mass or more, further preferably 2 parts by mass or more, and even further preferably 2.7 parts by mass or more relative to 100 parts by mass of the vinyl chloride resin, and is preferably 10 parts by mass or less, more preferably 8 parts by mass or less, even more preferably 6 parts by mass or less, and further preferably 5 parts by mass or less relative to 100 parts by mass of the vinyl chloride resin. When the content of the (c) vinyl chloride-(meth)acrylate copolymer in the vinyl chloride resin composition is not less than any of the lower limits set forth above, adhesiveness of a formed vinyl chloride resin molded product to a foamed polyurethane molded product can be further increased. On the other hand, when the content of the (c) vinyl chloride-(meth)acrylate copolymer in the vinyl chloride resin composition is not more than any of the upper limits set forth above, tensile characteristics (for example, tensile elongation and tensile strength) of a formed vinyl chloride resin molded product can be improved.

<Additives>

The presently disclosed vinyl chloride resin composition may further contain various additives besides the components set forth above. Examples of additives that may be used include, but are not specifically limited to, lubricants; stabilizers such as perchloric acid-treated hydrotalcite, zeolites, β-diketones, and fatty acid metal salts; mold release agents; dusting agents other than the previously described vinyl chloride resin fine particles; impact modifiers; perchloric acid compounds other than perchloric acid-treated hydrotalcite (sodium perchlorate, potassium perchlorate, etc.); antioxidants; fungicides; flame retardants; antistatic agents; fillers; light stabilizers; foaming agents; and pigments.

Additives that are described in WO2016/098344A1, for example, can be used as the aforementioned additives that can be contained in the presently disclosed vinyl chloride resin composition, and suitable amounts thereof may also be the same as described in WO2016/098344A1.

<Production Method of Vinyl Chloride Resin Composition>

The presently disclosed vinyl chloride resin composition can be produced by mixing the components described above.

Although no specific limitations are placed on the method by which the (a) vinyl chloride resin, (b) plasticizer, (c) vinyl chloride-(meth)acrylate copolymer, and various additives that can be further used as necessary are mixed, a method in which components other than a dusting agent (inclusive of vinyl chloride resin fine particles) and the (c) vinyl chloride-(meth)acrylate copolymer are mixed by dry blending and then the dusting agent and the (c) vinyl chloride-(meth)acrylate copolymer are subsequently added and mixed therewith, for example, may be adopted. The dry blending is preferably carried out using a Henschel mixer. Although the temperature during dry blending is not specifically limited, the temperature is preferably 50° C. or higher, and more preferably 70° C. or higher, and is preferably 200° C. or lower.

Also note that the temperature during addition and mixing of the (c) vinyl chloride-(meth)acrylate copolymer is preferably 90° C. or lower from a viewpoint of further increasing adhesiveness of a formed vinyl chloride resin molded product to a foamed polyurethane molded product.

<Use of Vinyl Chloride Resin Composition>

The obtained vinyl chloride resin composition can suitably be used in powder molding, and can more suitably be used in powder slush molding.

(Vinyl Chloride Resin Molded Product)

A feature of the presently disclosed vinyl chloride resin molded product is that it is obtained by molding the vinyl chloride resin composition set forth above by any method. As a result of the presently disclosed vinyl chloride resin molded product being formed using the vinyl chloride resin composition set forth above, the presently disclosed vinyl chloride resin molded product normally contains at least the (a) vinyl chloride resin, (b) plasticizer, and (c) vinyl chloride-(meth)acrylate copolymer, and has excellent adhesiveness to a foamed polyurethane molded product.

Consequently, a laminate formed by lining the presently disclosed vinyl chloride resin molded product with a foamed polyurethane molded product can suitably be used as an automobile interior material such as a surface skin of an automobile instrument panel because the vinyl chloride resin molded product and the foamed polyurethane molded product are adhered well to each other and are not easily peeled apart.

<Formation Method of Vinyl Chloride Resin Molded Product>

Although no specific limitations are placed on the mold temperature in powder slush molding in a situation in which the vinyl chloride resin molded product is formed by powder slush molding, the mold temperature is preferably 200° C. or higher, and more preferably 220° C. or higher, and is preferably 300° C. or lower, and more preferably 280° C. or lower.

The following method, for example, may be used in production of the vinyl chloride resin molded product without any specific limitations. In this method, the presently disclosed vinyl chloride resin composition is sprinkled onto a mold having a temperature within any of the ranges set forth above. The vinyl chloride resin composition is initially left for not less than 5 seconds and not more than 30 seconds and, after shaking off any excess vinyl chloride resin composition, is then further left for not less than 30 seconds and not more than 3 minutes at an arbitrary temperature. The mold is subsequently cooled to a temperature of not lower than 10° C. and not higher than 60° C., and the presently disclosed vinyl chloride resin molded product that is obtained is removed from the mold. A sheet-shaped molded product that imitates the shape of the mold is obtained.

It is preferable that particles of the previously described (c) vinyl chloride-(meth)acrylate copolymer are present at one surface of the obtained sheet-shaped vinyl chloride resin molded product. Particles of the (c) vinyl chloride-(meth)acrylate copolymer that are present at the surface of the vinyl chloride resin molded product function as adhesion points, thereby making it possible to further increase adhesiveness of the vinyl chloride resin molded product to a foamed polyurethane molded product. Moreover, it is preferable that particles of the (c) vinyl chloride-(meth)acrylate copolymer are not present at the other surface of the sheet-shaped vinyl chloride resin molded product. The absence of particles of the (c) vinyl chloride-(meth)acrylate copolymer makes it possible to achieve a good external appearance at the other surface.

For example, it is preferable that the (c) vinyl chloride-(meth)acrylate copolymer is sufficiently heated and melted at a surface at a side in contact with the mold in the formation method of the vinyl chloride resin molded product described above such that particles of the (c) vinyl chloride-(meth)acrylate copolymer do not remain. In a case in which particles of the (c) vinyl chloride-(meth)acrylate copolymer are not present at a surface of the formed sheet-shaped vinyl chloride resin molded product that was at a side in contact with the mold, the surface at the side that was in contact with the mold can be used as a surface of an automobile interior material, for example, so as to obtain an automobile interior material having good surface appearance. On the other hand, the heating temperature at a surface at an opposite side to the side in contact with the mold is preferably slightly lower than the heating temperature at the surface at the side in contact with the mold so that particles of the (c) vinyl chloride-(meth)acrylate copolymer remain thereat. In a case in which particles of the (c) vinyl chloride-(meth)acrylate copolymer are present at a surface of the formed sheet-shaped vinyl chloride resin molded product that is at an opposite side to the side that was in contact with the mold, it is possible to achieve good adhesion of the vinyl chloride resin molded product with a foamed polyurethane molded product when the surface at the opposite side to the side that was in contact with the mold is lined (stacked) with a foamed polyurethane molded product so as to form a laminate.

At least some of the particles of the (c) vinyl chloride-(meth)acrylate copolymer present at the surface of the vinyl chloride resin molded product may protrude from the surface of the vinyl chloride resin molded product.

(Laminate)

The presently disclosed laminate includes a foamed polyurethane molded product and the vinyl chloride resin molded product set forth above. The vinyl chloride resin molded product typically constitutes one surface of the laminate.

As a result of the presently disclosed laminate including a vinyl chloride resin molded product formed using the presently disclosed vinyl chloride resin composition, the vinyl chloride resin molded product and the foamed polyurethane molded product are adhered well, for example. Therefore, the presently disclosed laminate can suitably be used as an automobile interior material forming an automobile interior component (particularly an automobile instrument panel).

The method by which the foamed polyurethane molded product and the vinyl chloride resin molded product are stacked is not specifically limited and may, for example, be a method such as described below. Specifically, (1) a method in which the foamed polyurethane molded product and the vinyl chloride resin molded product are separately prepared and are subsequently adhered to one another by thermal fusion bonding, thermal adhesion, or using a commonly known adhesive, or (2) a method in which raw materials of the foamed polyurethane molded product such as an isocyanate and a polyol are caused to react and polymerize on the vinyl chloride resin molded product while carrying out polyurethane foaming by a commonly known method to directly form the foamed polyurethane molded product on the vinyl chloride resin molded product may be adopted. The latter method (2) is more suitable because it involves a simple process and enables laminates of various different shapes to be obtained while easily achieving strong adhesion of the vinyl chloride resin molded product and the foamed polyurethane molded product.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used to measure and evaluate the low-temperature tensile elongation, low-temperature tensile strength, and adhesiveness to a foamed polyurethane molded product of a vinyl chloride resin molded sheet, and the heat shrinkage resistance of a laminate. In addition, the presence or absence of particles of a vinyl chloride-(meth)acrylate copolymer at front and rear surfaces of a vinyl chloride resin molded sheet was confirmed by a method described below.

<Low-Temperature Tensile Elongation and Low-Temperature Tensile Strength>

<<Pre-Heating (Initial)>>

An obtained vinyl chloride resin molded sheet was punched out by a No. 1 Dumbbell described in JIS K6251, and then tensile breaking elongation (%) and tensile breaking stress (MPa) at a low temperature of −35° C. were measured in accordance with JIS K7113 at a tensing rate of 200 mm/min. A larger value for the tensile breaking elongation indicates that the vinyl chloride resin molded sheet has better pre-heating (initial) tensile elongation at low temperature (low-temperature tensile elongation). Moreover, a larger value for the tensile breaking stress indicates that the vinyl chloride resin molded sheet has better pre-heating (initial) tensile strength at low temperature (low-temperature tensile strength).

<<Post-Heating (Heat Aging Test)>>

A laminate lined with a foamed polyurethane molded product was used as a sample. The sample was placed in an oven and was heated in an environment having a temperature of 130° C. for 100 hours. Thereafter, the foamed polyurethane molded product was peeled from the laminate that had been heated so as to prepare just a vinyl chloride resin molded sheet. The tensile breaking elongation (%) and tensile breaking stress (MPa) of the vinyl chloride resin molded sheet after 100 hours of heating were measured under the same conditions as at the initial stage described above. A larger value for the tensile breaking elongation indicates that the vinyl chloride resin molded sheet has better post-heating low-temperature tensile elongation. Moreover, a larger value for the tensile breaking stress indicates that the vinyl chloride resin molded sheet has better post-heating low-temperature tensile strength.

<Adhesiveness to Foamed Polyurethane Molded Product>

A laminate lined with a foamed polyurethane molded product was cut to dimensions of 200 mm in length by 25 mm in width to obtain a test specimen. The peel strength (N/25 mm) between the vinyl chloride resin molded sheet and the foamed polyurethane molded product of the test specimen was measured using a tensile tester (produced by Shimadzu Corporation; product name: AG-20KNISD) under conditions of a peeling rate of 200 mm/min and a peeling angle of 180°. A larger value for the peel strength indicates that the vinyl chloride resin molded sheet has better adhesiveness to the foamed polyurethane molded product.

<Heat Shrinkage Resistance>

A 3D coordinate measuring instrument (Crysta-Plus M443 produced by Mitutoyo Corporation) was used to measure the transverse direction length of a laminate lined with a foamed polyurethane molded product so as to determine an actual measurement value for before heating. Thereafter, the laminate was stored and heated in a 130° C. Geer-type oven (Geer Oven produced by Toyo Seiki Seisaku-Sho, Ltd.) as accelerated testing for long-term use. Once 100 hours had passed, the laminate was removed from the oven, and the transverse direction length of the laminate was measured by the 3D coordinate measuring instrument to determine an actual measurement value for after heating. The actual measurement values for before and after heating were used to calculate a heat shrinkage rate indicated by the following formula. A smaller value for the heat shrinkage rate indicates that there is less heat shrinkage of the laminate and that the laminate has better heat shrinkage resistance.

Heat shrinkage rate=100×(Actual measurement value for before heating−Actual measurement value for after heating)/Actual measurement value for before heating <Presence or Absence of Particles of Vinyl Chloride-(Meth)Acrylate Copolymer>

The presence or absence of particles of a vinyl chloride-(meth)acrylate copolymer at front and rear surfaces of a vinyl chloride resin molded sheet was confirmed through visual inspection. Note that the "front surface" of the vinyl chloride resin molded sheet is a textured surface at a side that was in contact with a mold, whereas the "rear surface" of the vinyl chloride resin molded sheet is a surface at an opposite side to the textured surface at the side that was in contact with the mold (i.e., the "rear surface" is a surface at a side that is to be lined with a foamed polyurethane molded product).

Production Example

A polyester used in the examples and comparative example was produced as follows.
<Polyester A>
Adipic acid as a polybasic carboxylic acid, 3-methyl-1, 5-pentanediol as a polyhydric alcohol, and 2-ethylhexanol as a stopper (terminal stopping component) were charged to a reactor, tetraisopropyl titanate was added as a catalyst, solvent was added as appropriate, and heating thereof was performed under stirring. Water produced as a by-product was removed at normal pressure and at reduced pressure, and the temperature was finally raised to 220° C. to 230° C. to complete a dehydration condensation reaction. The obtained product was then subjected to thin-film evaporation under conditions of a pressure of 4 Pa to 80 Pa and a jacket temperature of 250° C. to yield a polyester A (viscosity: 3,600 m·Pas; number-average molecular weight: 5,300; acid value: 0.32 mg KOH/g; hydroxyl value: 12.7 mg KOH/g) including 2-ethylhexoxy groups at the terminals thereof.

Example 1

<Production of Vinyl Chloride Resin Composition>
With the exception of plasticizers (polyester A and epoxidized soybean oil), vinyl chloride resin fine particles used as a dusting agent, and a vinyl chloride-(meth)acrylate copolymer, the ingredients indicated in Table 1 were loaded into and mixed in a Henschel mixer. At the point at which the temperature of the mixture rose to 80° C., all of the plasticizers were added, and drying up of the mixture was caused to occur (i.e., the mixture changed to a dry state through absorption of the plasticizers by vinyl chloride resin particles used as a vinyl chloride resin). Thereafter, once the dried-up mixture had cooled to 90° C. or lower, the vinyl chloride resin fine particles used as the dusting agent and the vinyl chloride-(meth)acrylate copolymer were added to the mixture to produce a vinyl chloride resin composition.
<Formation of Vinyl Chloride Resin Molded Product>
A vinyl chloride resin molded sheet having dimensions of 200 mm×300 mm×1 mm was produced as described below.
Specifically, the vinyl chloride resin composition obtained as described above was sprinkled onto a textured mold that was heated to a temperature of 250° C. and, after being left to melt for an arbitrary time, excess vinyl chloride resin composition was shaken off. Thereafter, the textured mold onto which the vinyl chloride resin composition had been sprinkled was placed at rest in an oven set to a temperature of 200° C., and once 60 seconds had passed after being placed at rest, the textured mold was cooled with cooling water. Once the mold temperature had dropped to 40° C., a vinyl chloride resin molded sheet was removed from the mold as a vinyl chloride resin molded product.
Pre-heating (initial) low-temperature tensile elongation and low-temperature tensile strength were measured and evaluated for the obtained vinyl chloride resin molded sheet (dimensions: 200 mm×300 mm×1 mm) by the previously described methods. Moreover, the presence or absence of particles of the vinyl chloride-(meth)acrylate copolymer at front and rear surfaces of the vinyl chloride resin molded sheet was confirmed by the previously described method. The results are shown in Table 1.

<Formation of Laminate>
The obtained vinyl chloride resin molded sheet (dimensions: 200 mm×300 mm×1 mm) was placed inside a 200 mm×300 mm×10 mm mold with the textured surface facing downward.
A polyol mixture was separately obtained by mixing 50 parts of a PO (propylene oxide)/EO (ethylene oxide) block adduct of propylene glycol (hydroxyl value: 28 mg KOH/g; terminal EO unit content: 10%; internal EO unit content: 4%), 50 parts of a PO/EO block adduct of glycerin (hydroxyl value: 21 mg KOH/g; terminal EO unit content: 14%), 2.5 parts of water, 0.2 parts of an ethylene glycol solution of triethylenediamine (produced by Tosoh Corporation; product name: TEDA-L33), 1.2 parts of triethanolamine, 0.5 parts of triethylamine, and 0.5 parts of a foam stabilizer (produced by Shin-Etsu Chemical Co., Ltd.; product name: F-122). The obtained polyol mixture was mixed with polymethylene polyphenylene polyisocyanate (polymeric MDI) in a ratio determined to give an index of 98 so as to prepare a mixed liquid. The prepared mixed liquid was poured onto the vinyl chloride resin molded sheet that had been placed in the mold as described above. Thereafter, the mold was covered by a 348 mm×255 mm×10 mm aluminum plate to seal the mold. After sealing, the mold was left for 5 minutes so as to form a laminate in which a vinyl chloride resin molded sheet (thickness: 1 mm) as a surface skin was lined with a foamed polyurethane molded product (thickness: 9 mm; density: 0.2 g/cm$^3$).
The formed laminate was removed from the mold, and adhesiveness of the vinyl chloride resin molded sheet to the foamed polyurethane molded product was measured and evaluated by the previously described method. The result is shown in Table 1.

Examples 2 to 8

A vinyl chloride resin composition, a vinyl chloride resin molded product, and a laminate were produced in the same way as in Example 1 with the exception that the type and additive amount of the vinyl chloride-(meth)acrylate copolymer were changed as indicated in Table 1. Measurements and evaluations were made in the same manner as in Example 1. Note that in Examples 4 to 6, the obtained laminate was also used to measure and evaluate post-heating low-temperature tensile elongation and low-temperature tensile strength of the vinyl chloride resin molded sheet by the previously described method. Moreover, in Examples 5 and 6, the heat shrinkage resistance of the obtained laminate was also measured and evaluated by the previously described method. The results are shown in Table 1.

Comparative Example 1

A vinyl chloride resin composition, a vinyl chloride resin molded product, and a laminate were produced in the same way as in Example 1 with the exception that a vinyl chloride-(meth)acrylate copolymer was not added. Measurements and evaluations were made in the same manner as in Example 1. Note that the obtained laminate was also used to measure and evaluate post-heating low-temperature tensile elongation and low-temperature tensile strength of the vinyl chloride resin molded sheet and heat shrinkage resistance of the laminate by the previously described methods. The results are shown in Table 1.

TABLE 1

| | | | Comparative Example 1 | Example 1 | Example 2 | Example 3 | Example 4 |
|---|---|---|---|---|---|---|---|
| Formulation | Vinyl chloride resin | Vinyl chloride resin particles[1] [parts by mass] | 100 | 100 | 100 | 100 | 100 |
| | | Vinyl chloride resin fine particles[2] [parts by mass] | 18 | 18 | 18 | 18 | 18 |
| | Plasticizer | Polyester A [parts by mass] | 130 | 130 | 130 | 130 | 130 |
| | | Epoxidized soybean oil[3] [parts by mass] | 5 | 5 | 5 | 5 | 5 |
| | Stabilizer | Perchloric acid-substituted hydrotalcite[4] [parts by mass] | 4.6 | 4.6 | 4.6 | 4.6 | 4.6 |
| | | Zeolite[5] [parts by mass] | 2.4 | 2.4 | 2.4 | 2.4 | 2.4 |
| | | Stearoylbenzoylmethane (β-diketone)[6] [parts by mass] | 0.5 | 0.5 | 0.5 | 0.5 | 0.5 |
| | | Zinc stearate[7] [parts by mass] | 0.2 | 0.2 | 0.2 | 0.2 | 0.2 |
| | | Hindered amine light stabilizer[8] [parts by mass] | 0.2 | 0.2 | 0.2 | 0.2 | 0.2 |
| | | Triisodecyl phosphite[9] [parts by mass] | 0.3 | 0.3 | 0.3 | 0.3 | 0.3 |
| | Mold release agent | 12-Hydroxystearic acid[10] [parts by mass] | 0.6 | 0.6 | 0.6 | 0.6 | 0.6 |
| | Vinyl chloride-(meth)acrylate copolymer (W)[11] [parts by mass] (proportion of alkyl (meth)acrylate-derived structural units: approximately 40 mass %) | | — | — | — | 5 | — |
| | Vinyl chloride-(meth)acrylate copolymer (X)[12] [parts by mass] (proportion of alkyl (meth)acrylate-derived structural units: approximately 16 mass %) | | — | — | — | — | 1 |
| | Vinyl chloride-(meth)acrylate copolymer (Y)[13] [parts by mass] (proportion of alkyl (meth)acrylate-derived structural units: approximately 7 mass %) | | — | — | 5 | — | — |
| | Vinyl chloride-(meth)acrylate copolymer (Z)[14] [parts by mass] (proportion of alkyl (meth)acrylate-derived structural units: approximately 5 mass %) | | — | 5 | — | — | — |
| | Pigment | Black color (carbon black)[15] [parts by mass] | 3.8 | 3.8 | 3.8 | 3.8 | 3.8 |
| Content of vinyl chloride-(meth)acrylate copolymer [parts by mass/100 parts by mass of vinyl chloride resin] | | | — | 4.2 | 4.2 | 4.2 | 0.8 |
| Evaluation results | Peel strength between vinyl chloride resin molded sheet and foamed polyurethane molded product [N/25 mm] (adhesiveness to foamed polyurethane molded product) | | 0.5 | 1.4 | 2.1 | 1.7 | 1.0 |
| | Heat shrinkage rate [%] (heat shrinkage resistance) | | 1.0 | — | — | — | — |
| | Presence of particles of vinyl chloride-(meth)acrylate copolymer | Front surface | No | No | No | No | No |
| | | Rear surface | No | Yes | Yes | Yes | Yes |
| | Pre-heating (initial) | Low-temperature (−35° C.) tensile breaking elongation [%] | 145 | 120 | 145 | 145 | 150 |
| | | Low-temperature (−35° C.) tensile breaking stress [MPa] | 18.0 | 18.0 | 19.0 | 18.0 | 19.0 |
| | After heating at 130° C. for 100 hours | Low-temperature (−35° C.) tensile breaking elongation [%] | 140 | — | — | — | 145 |
| | | Low-temperature (−35° C.) tensile breaking stress [MPa] | 19.0 | — | — | — | 19.0 |

| | | | Example 5 | Example 6 | Example 7 | Example 8 |
|---|---|---|---|---|---|---|
| Formulation | Vinyl chloride resin | Vinyl chloride resin particles[1] [parts by mass] | 100 | 100 | 100 | 100 |
| | | Vinyl chloride resin fine particles[2] [parts by mass] | 18 | 18 | 18 | 18 |
| | Plasticizer | Polyester A [parts by mass] | 130 | 130 | 130 | 130 |
| | | Epoxidized soybean oil[3] [parts by mass] | 5 | 5 | 5 | 5 |
| | Stabilizer | Perchloric acid-substituted hydrotalcite[4] [parts by mass] | 4.6 | 4.6 | 4.6 | 4.6 |
| | | Zeolite[5] [parts by mass] | 2.4 | 2.4 | 2.4 | 2.4 |
| | | Stearoylbenzoylmethane (β-diketone)[6] [parts by mass] | 0.5 | 0.5 | 0.5 | 0.5 |
| | | Zinc stearate[7] [parts by mass] | 0.2 | 0.2 | 0.2 | 0.2 |
| | | Hindered amine light stabilizer[8] [parts by mass] | 0.2 | 0.2 | 0.2 | 0.2 |
| | | Triisodecyl phosphite[9] [parts by mass] | 0.3 | 0.3 | 0.3 | 0.3 |
| | Mold release agent | 12-Hydroxystearic acid[10] [parts by mass] | 0.6 | 0.6 | 0.6 | 0.6 |

TABLE 1-continued

| | | | | | |
|---|---|---|---|---|---|
| | Vinyl chloride-(meth)acrylate copolymer (W)[11] [parts by mass] (proportion of alkyl (meth)acrylate-derived structural units: approximately 40 mass %) | | — | — | — | — |
| | Vinyl chloride-(meth)acrylate copolymer (X)[12] [parts by mass] (proportion of alkyl (meth)acrylate-derived structural units: approximately 16 mass %) | | 3 | 5 | 7 | 10 |
| | Vinyl chloride-(meth)acrylate copolymer (Y)[13] [parts by mass] (proportion of alkyl (meth)acrylate-derived structural units: approximately 7 mass %) | | — | — | — | — |
| | Vinyl chloride-(meth)acrylate copolymer (Z)[14] [parts by mass] (proportion of alkyl (meth)acrylate-derived structural units: approximately 5 mass %) | | — | — | — | — |
| | Pigment | Black color (carbon black)[15] [parts by mass] | 3.8 | 3.8 | 3.8 | 3.8 |
| Content of vinyl chloride-(meth)acrylate copolymer [parts by mass/100 parts by mass of vinyl chloride resin] | | | 2.5 | 4.2 | 5.9 | 8.5 |
| Evaluation results | Peel strength between vinyl chloride resin molded sheet and foamed polyurethane molded product [N/25 mm] (adhesiveness to foamed polyurethane molded product) | | 1.4 | 1.6 | 1.8 | 2.2 |
| | Heat shrinkage rate [%] (heat shrinkage resistance) | | 1.0 | 0.9 | — | — |
| | Presence of particles of vinyl chloride-(meth)acrylate copolymer | Front surface | No | No | No | No |
| | | Rear surface | Yes | Yes | Yes | Yes |
| | Pre-heating (initial) | Low-temperature (−35° C.) tensile breaking elongation [%] | 140 | 150 | 130 | 120 |
| | | Low-temperature (−35° C.) tensile breaking stress [MPa] | 19.0 | 19.0 | 18.0 | 17.5 |
| | After heating at 130° C. for 100 hours | Low-temperature (−35° C.) tensile breaking elongation [%] | 140 | 140 | — | — |
| | | Low-temperature (−35° C.) tensile breaking stress [MPa] | 18.5 | 19.0 | — | — |

[1] Product name: ZEST ® (ZEST is a registered trademark in Japan, other countries, or both) 2000Z (produced by suspension polymerization; average degree of polymerization: 2,000; average particle diameter: 130 μm); produced by Shin Dai-ichi Vinyl Corporation
[2] Product name: ZEST PQLTX (produced by emulsion polymerization; average degree of polymerization: 800; average particle diameter: 1.8 μm); produced by Shin Dai-ichi Vinyl Corporation
[3] Product name: ADK CIZER O-130S; produced by Adeka Corporation
[4] Product name: ALCAMIZER ® (ALCAMIZER is a registered trademark in Japan, other countries, or both) 5; produced by Kyowa Chemical Industry Co., Ltd.
[5] Product name: MIZUKALIZER DS; produced by Mizusawa Industrial Chemicals, Ltd.
[6] Product name: Karenz DK-1; produced by Showa Denko K. K.
[7] Product name: SAKAI SZ2000; produced by Sakai Chemical Industry Co., Ltd.
[8] Product name: ADK STAB LA-72; produced by Adeka Corporation
[9] Product name: ADK STAB SC-131; produced by Adeka Corporation
[10] Product name: ADK STAB LS-12; produced by Adeka Corporation
[11] Product name: AG-40M (graft copolymer of vinyl chloride and (meth)acrylate; average particle diameter: 120 μm); produced by Sekisui Chemical Co., Ltd.
[12] Product name: AG-162E (graft copolymer of vinyl chloride and (meth)acrylate; average particle diameter: 90 μm); produced by Sekisui Chemical Co., Ltd.
[13] Product name: AG-72P (graft copolymer of vinyl chloride and (meth)acrylate; average particle diameter: 120 μm); produced by Sekisui Chemical Co., Ltd.
[14] Product name: AG-64T (graft copolymer of vinyl chloride and (meth)acrylate; average particle diameter: 100 μm); produced by Sekisui Chemical Co., Ltd.
[15] Product name: DA PX 1720(A) Black; produced by Dainichiseika Color and Chemicals Mfg. Co., Ltd.

It can be seen from Table 1 that the vinyl chloride resin compositions of Examples 1 to 8, which each contain a vinyl chloride resin, a plasticizer, and a vinyl chloride-(meth)acrylate copolymer, enable formation of a vinyl chloride resin molded product having excellent adhesiveness to a foamed polyurethane molded product.

In contrast, it can be seen that a vinyl chloride resin molded product formed using the vinyl chloride resin composition of Comparative Example 1, which does not contain a vinyl chloride-(meth)acrylate copolymer, has poor adhesiveness to a foamed polyurethane molded product.

INDUSTRIAL APPLICABILITY

According to the present disclosure, it is possible to provide a vinyl chloride resin composition that can form a vinyl chloride resin molded product having excellent adhesiveness to a foamed polyurethane molded product.

Moreover, according to the present disclosure, it is possible to provide a vinyl chloride resin molded product having excellent adhesiveness to a foamed polyurethane molded product.

Furthermore, according to the present disclosure, it is possible to provide a laminate in which a vinyl chloride resin molded product and a foamed polyurethane molded product are adhered well.

The invention claimed is:
1. A vinyl chloride resin composition comprising a vinyl chloride resin, a plasticizer, and a vinyl chloride-(meth) acrylate copolymer, wherein
the plasticizer includes a polyester, and wherein
the content of the polyester in the vinyl chloride resin composition is 100 parts by mass or more relative to 100 parts by mass of the vinyl chloride resin, and 200 parts by mass or less relative to 100 parts by mass of the vinyl chloride resin, and wherein
the content of the vinyl chloride-(meth) acrylate copolymer is not less than 4.2 parts by mass and not more than 8 parts by mass relative to 100 parts by mass of the vinyl chloride resin, and wherein
an average particle diameter of particles of the vinyl chloride-(meth) acrylate copolymer is 50 μm or more and 160 μm or less.

2. The vinyl chloride resin composition according to claim 1, wherein a proportion constituted by (meth) acrylate-derived structural units in the vinyl chloride-(meth) acrylate copolymer is not less than 3 mass % and not more than 50 mass %.

3. The vinyl chloride resin composition according to claim 1, wherein the polyester includes an adipic acid-derived structural unit and a 3-methyl-1,5-pentanediol-derived structural unit.

4. The vinyl chloride resin composition according to claim 1 used in powder molding.

5. The vinyl chloride resin composition according to claim 1 used in powder slush molding.

6. A vinyl chloride resin molded product obtained through molding of the vinyl chloride resin composition according to claim 1.

7. The vinyl chloride resin molded product according to claim 6 for an automobile instrument panel surface skin.

8. The vinyl chloride resin molded product according to claim 6, wherein
the vinyl chloride resin molded product is a sheet-shaped vinyl chloride resin molded product, and
particles of the vinyl chloride-(meth) acrylate copolymer are present at one surface of the sheet-shaped vinyl chloride resin molded product.

9. A laminate comprising: a foamed polyurethane molded product; and the vinyl chloride resin molded product according to claim 6.

10. The laminate according to claim 9 for an automobile instrument panel.

* * * * *